May 8, 1956  E. P. TYLER ET AL  2,744,510
COMPRESSION BRAKING SYSTEM FOR INTERNAL COMBUSTION ENGINES
Filed April 26, 1952
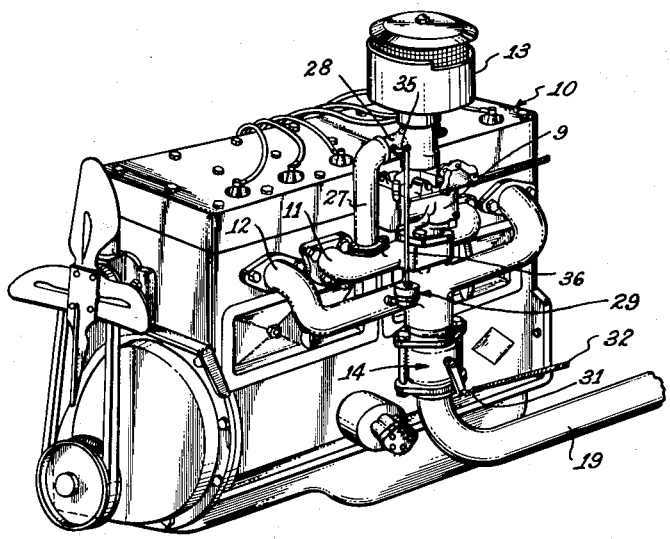
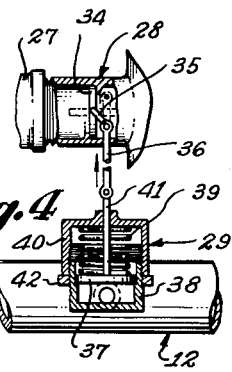
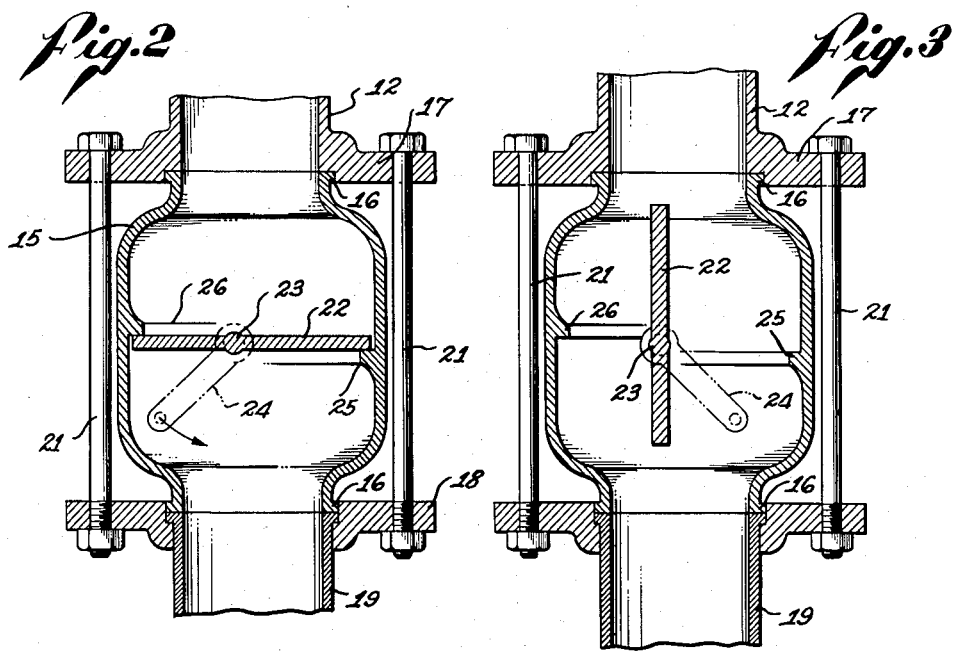
INVENTORS
EDWARD P. TYLER
ABE E. GOODMAN
BY
Fulwider & Mattingly
Attorneys

United States Patent Office 2,744,510
Patented May 8, 1956

2,744,510

COMPRESSION BRAKING SYSTEM FOR INTERNAL COMBUSTION ENGINES

Edward P. Tyler and Abe E. Goodman,
North Hollywood, Calif.

Application April 26, 1952, Serial No. 284,538

4 Claims. (Cl. 123—97)

The present invention relates generally to the control of internal combustion engines and more particularly to a system for increasing the resistive torque of such engines for braking purposes. While the present invention will be described in connection with an automobile engine, it will be realized that the usefulness of the invention is not limited to such engines but may also be employed in other vehicular or stationary internal combustion engines wherever braking torque is desired.

It has long been customary to employ the engine of a conventional automobile as a retarding or braking means when running downhill or coasting the vehicle to a stop. Ordinarily this is accomplished merely by closing the throttle and leaving the engine connected through the power transmission to the wheels. Such operation is usually referred to as running the vehicle "in compression." Under such conditions, the engine then acts as a pump and since the throttle is closed, a certain degree of vacuum is developed in the intake manifold, thus resisting operation of the motor and as a consequence applying a retarding torque to the drive wheels.

The procedure above mentioned has several disadvantages, chief among which is the fact that it is somewhat wasteful of fuel due to the fact that the high degree of vacuum draws fuel through the idling jets and even some fuel past the closed throttle. Not only is this wasteful of fuel, but since the fuel continues to ignite, the effectiveness of the engine as a brake is somewhat reduced and unnecessary heat is produced therein.

Another disadvantage of the foregoing procedure arose with the advent of fluid couplings in the power transmission of automobiles. Since the resistive torque of an engine operating in compression as above-described, increases with the speed of the engine and is effective only if the engine is turning at a relatively rapid rate, the loss of speed due to the slippage in a fluid coupling reduces the effectiveness of the engine as a brake.

Bearing in mind the foregoing problems and desiderata it is a major object of the present invention to provide auxiliary attachment means for the internal combustion engine of a motor vehicle to increase the engine's effectiveness as a brake when running in compression.

It is another object of the invention to provide means of the class just described which may be attached to conventional automobile engines without substantial modification thereof.

It is still another object of the invention to provide an attachment of the class described which automatically prevents the drawing of fuel into the engine during the time that it is being used as a brake whereby to prevent wastage of fuel and excessive engine heating.

A further object of the invention is to provide means of the class above-described which may be readily controlled from the operator's compartment of a motor vehicle, or alternatively, may be coupled to the conventional braking system so as to operate concurrently therewith.

The foregoing, and additional objects and advantages of the invention will be apparent from a consideration of the following detailed description of a presently preferred embodiment thereof, consideration being given likewise to the attached drawings, in which:

Fig. 1 is a perspective view of a conventional automobile engine incorporating an attachment according to the present invention;

Figs. 2 and 3 are elevational axial sections taken through an exhaust manifold valve forming a part of the attachment illustrated in Fig. 1, the valve being shown closed in Fig. 2 and open in Fig. 3; and Fig. 4 is an elevational section taken through a by-pass valve and pressure actuator forming a part of the attachment shown in Fig. 1.

In Fig. 1 a conventional automobile engine is indicated generally by the reference character 10 and includes an intake manifold 11 and an exhaust manifold 12 of conventional design. The attachment means embodying the present invention comprises an exhaust manifold valve 14 interposed between the exhaust manifold 12 and the exhaust pipe 19, a by-pass 27 interconnected between the intake manifold 11 and a point in the air intake above the carburetor 9 and below the air cleaner 13. The by-pass conduit 27 includes a valve 28 (see Fig. 4) operated by a pressure responsive actuator 29 which in turn is pressure-connected to the exhaust manifold 12, as can be seen in Figs. 1 and 4.

The exhaust manifold valve 14 is shown in detail in Figs. 2 and 3. Here it will be seen that the valve proper includes a valve body 15 in which is mounted a butterfly 22 secured on a transverse shaft 23 for rotation from the closed position shown in Fig. 2 to the open position shown in Fig. 3 and vice versa. A pair of shoulders 25 and 26 are formed in the interior surface of the housing 15 so as to limit rotation of the butterfly 22 in its closed position. Also it will be noted that the shaft 23 is slightly offset (to the left in Fig. 2) so that an excessive pressure upstream from the valve (above in Fig. 2) tends to hold the valve in closed position.

The valve 14 is secured in place by separating the conventional attachment flanges 17 and 18 which normally secure the exhaust pipe 19 to the exhaust manifold 12 and interposing the valve 14, the latter having terminal flanges 16 formed thereon and adapted to enter the normal gasketing recess found in the conventional attachment flange. The valve 14 is held in place by a pair of elongated flange bolts 21 engaging the conventional attachment flanges 17 and 18 of the manifold 12 and the exhaust pipe 19, respectively.

A pivot shaft 23 of the butterfly 22 is provided with a crank arm 24 externally of the body 15 to which is attached a conventional Bowden control wire 31 encased in a flexible sheath 32 in conventional fashion. The Bowden control 31—32 may be actuated either by manual control (not shown) of conventional design mounted on the dashboard in the operator's compartment, or alternatively, may be connected to the conventional brake pedal whereby the valve 14 will be closed when the brake pedal is fully depressed.

The details of the by-pass 27 and its concomitant valve 28 and pressure actuator 29 is best seen in Fig. 4. Here it will be seen that the valve 28 is similar in construction to the valve 14, having a rotatable butterfly 34 operated by an external crank lever 35 which is connected by a rod 36 to the pressure actuator 29 so as to be actuated by the latter.

The actuator 29 includes an expansible chamber comprised of a piston 37 movable in a cylinder 38, the latter being communicated with the exhaust manifold 12. Thus when pressure in the exhaust manifold 12 rises the piston 37 is urged upwardly such motion being resisted by a compression spring 39 mounted between the upper surface of piston 37 and an upper abutment or collar member 40 which also serves as a guide for the rod 41 of the piston 37.

The spring abutment member 40 is threaded to the cylinder 38 and provided with a locking ring 42 whereby the initial pressure exerted by the spring 39 may be adjusted and set. When the pressure in the expansible chamber 37—38 reaches a predetermined value in excess of the initial pressure of the spring 39 the piston 37 is moved upwardly and through the connection of the piston rod 41 and connecting rod 36 rotates the valve arm 35 to open the butterfly 34 of the valve 28.

The efficiency of the system just described is further enhanced if used in conjunction with a conventional supercharger or compressed air system connected to deliver compressed air into the by-pass 27 or into the exhaust manifold 12 thus increasing the resistive thrust on the pistons. Since the construction and mode of operation of superchargers and air compressors per se are well known, a detailed description and illustration thereof herein is deemed unnecessary.

The operation of the device is as follows. When it is desired to employ compressive braking the exhaust manifold valve 14 is closed either by manual operation of the dashboard control or if the device is so connected, by depression of the conventional brake pedal. Such closure results in a back pressure being built up in the exhaust manifold 12 and cylinders of the engine 10 whereby the movement of the pistons in the engine 10 is strongly resisted both during the compression stroke, and during the exhaust stroke of the engine. Such resistance to piston movement has a pronounced braking effect since the engine is rotatively coupled to the driving wheels through the transmission. Additionally, the compression of the air in the engine cylinders in the manner above described heats it adiabatically and such heat is absorbed by the cooling system of the engine. Also a certain amount of the compressed air escapes from the engine cylinders due to the facts that the sealing of the valve 14 cannot be made perfect, and the engine pistons do not make a perfect seal against the cylinder walls.

Thus a substantial amount of kinetic energy of motion of the vehicle is converted to heat and dissipated through the cooling system of the engine. Also the kinetic energy of motion is converted into potential energy contained in the escaping compressed air above-mentioned. Thus while the back pressure in the combustion chambers delivers a certain amount of energy back into the engine during the power downstroke of the pistons, the amount of such energy delivered by re-expansion of the air in the combustion chambers is much less than that absorbed by the air during the compression thereof and due to the aforesaid dissipation as heat. The overall effect of the foregoing operation is to greatly increase the efficiency of the engine as a brake. Both the above factors of increased efficiency are further enhanced by the use of a supercharger as above described. The resistance to piston movement is increased due to the increased pressure at which air is introduced into the cylinders and also a greater weight of air passes through the engine thus making possible a greater adiabatic heat transfer.

As soon as the back pressure in the exhaust manifold 12 rises, due to the closing of the valve 14 in the manner above stated, the pressure responsive actuator 29 operates to open the by-pass 27. Thus such air as is pumped through the engine during the compressive braking operation thereof passes around and not through the carburetor 9. Thus no fuel is wasted during the braking operation and no unnecessary heat or mechanical power is delivered into the engine during the time that it is desired to use the same as a brake.

Upon reopening the valve 14, the pressure in the exhaust manifold 12 returns to its normal operating value, thus causing the valve 28 to be closed automatically through the operation of the spring 39 which forces the connecting rods 41 and 36 downwardly. Thus normal operation of the engine is resumed, the same being entirely unaffected by the braking attachment.

The foregoing system, it will be seen, relies primarily on increasing the resistance to piston up-strokes. The operation of the engine is modified so that during the exhaust stroke the piston is doing substantial work in compressing air rather than merely expelling burned gas from the cylinder. It will also be realized that the same result can be achieved by retiming the operation of the engine valves so that during compressive braking operation the exhaust valve remains closed during what would otherwise be the exhaust stroke. Similarly the valve timing can be further modified so that during what would normally be the power stroke, the intake valve is open so as to admit a fresh charge of air for compression during the succeeding exhaust stroke. Valve timing mechanisms being known in the art, it is deemed unnecessary further to describe or illustrate such means herein. Suffice it to say that with the valve timing modified as above set forth, each cylinder is always sealed during every up stroke of the piston therein and open to the intake during the downstroke. The exhaust valves are open momentarily at the top of each stroke to release the compressed air and its concommitant potential energy.

It will be seen that the arrangement embodying the present invention is of particular advantage in braking vehicles, such as trucks, on long downgrade hauling operations since the mechanical energy which is converted into heat is discharged with the compressed air or is dissipated through the cooling system of the engine rather than being concentrated in the brake drums and shoes with the attendant danger of burning the latter.

While the attachment means shown and described herein is fully capable of achieving the objects and providing the advantages hereinbefore set forth, it will be realized by those skilled in the art that it is capable of considerable modification without departure from the spirit of the invention. For this reason we do not mean to be limited to the form shown and described but rather to the scope of the appended claims.

We claim:

1. A compressive braking attachment for an internal combustion engine comprising in combination: a valve in the exhaust manifold of said engine; a manually operable control for said exhaust manifold valve; a conduit connected to the intake manifold and adapted to by-pass the fuel intake to said intake manifold; a normally closed valve in said by-pass conduit; and control means including a pressure responsive actuator fluid connected to said exhaust manifold and mechanically connected to said by-pass valve to open said by-pass valve upon closing of said exhaust manifold valve.

2. In a motor vehicle having an internal combustion engine with an intake manifold having a single fuel-air inlet port and an exhaust manifold having a single exhaust port, a compressive braking attachment comprising in combination: a normally open, manually operable butterfly valve in said exhaust port; means forming a by-pass port in said intake manifold adapted to admit pure air thereto; a normally closed valve in said by-pass port; and control means including an expansible fluid chamber connected to said exhaust manifold and mechanically connected to said by-pass valve to open the the same upon a rise in pressure in said exhaust manifold due to closure of said valve therein.

3. The construction of claim 2 further characterized in having a spring connected to said control means to counteract the force exerted by said expansible chamber and urge said by-pass valve in a closing direction.

4. The construction of claim 3 further characterized in that the initial force of said spring is adjustable whereby to preset said control means to operate at a given exhaust manifold pressure.

References Cited in the file of this patent

UNITED STATES PATENTS

| | | |
|---|---|---|
| 925,528 | Sweet | June 22, 1909 |
| 934,547 | Krebs | Sept. 21, 1909 |
| 1,483,657 | Glidden | Feb. 12, 1924 |
| 1,667,016 | Stokes | Apr. 24, 1928 |
| 1,679,367 | Meysenburg | Aug. 7, 1928 |
| 1,803,145 | Reineke | Apr. 28, 1931 |
| 1,843,238 | Messinger | Feb. 2, 1932 |
| 1,850,405 | Lothrop | Mar. 22, 1932 |
| 1,890,790 | Messinger | Dec. 13, 1932 |
| 1,940,712 | Ertz | Dec. 26, 1933 |
| 2,168,232 | Messinger | Aug. 1, 1939 |